(12) United States Patent
Watson et al.

(10) Patent No.: US 8,675,922 B1
(45) Date of Patent: Mar. 18, 2014

(54) VISIBLE MOTION BLUR

(75) Inventors: Andrew B. Watson, Los Gatos, CA (US); Albert J. Ahumada, Mountain View, CA (US)

(73) Assignee: The United States of America as Represented by the Administrator of the National Aeronautics & Space Administration (NASA), Washington, DC (US)

(*) Notice: Subject to any disclaimer, the term of this patent is extended or adjusted under 35 U.S.C. 154(b) by 142 days.

(21) Appl. No.: 13/444,777

(22) Filed: Apr. 11, 2012

Related U.S. Application Data

(60) Provisional application No. 61/520,357, filed on May 24, 2011.

(51) Int. Cl.
*G06K 9/00* (2006.01)
*H04N 5/228* (2006.01)

(52) U.S. Cl.
USPC .................. 382/107; 382/255; 348/208.4

(58) Field of Classification Search
USPC ......... 382/100, 103, 106–107, 162, 167, 168, 382/173, 181, 191, 199, 232, 254–255, 382/274–275, 276, 305, 312; 348/222.1, 348/208.4; 250/221; 345/102, 690
See application file for complete search history.

(56) References Cited

U.S. PATENT DOCUMENTS

| | | | |
|---|---|---|---|
| 7,317,445 B2 * | 1/2008 | Hekstra et al. | 345/102 |
| 7,783,130 B2 | 8/2010 | Watson | |
| 2005/0168492 A1 * | 8/2005 | Hekstra et al. | 345/690 |
| 2008/0061220 A1 * | 3/2008 | Machida | 250/221 |
| 2008/0170124 A1 * | 7/2008 | Hatanaka et al. | 348/208.4 |
| 2010/0066850 A1 * | 3/2010 | Wilson et al. | 348/222.1 |

OTHER PUBLICATIONS

Video Electronics Standards Association (VESA), "Flat Panel Display Measurements Standard (FPDM), Version 2.0," Video Electronics Standards Association, Milpitas, CA, 2001.
G. E. Legge and J. M. Foley, "Contrast masking in human vision," J. Opt. Soc. Am., 70, 1458-71, 1980.
J. R. Hamerly and C. A. Dvorak, "Detection and discrimination of blur in edges and lines," J. Opt. Soc. Am., 71, 448, 1981.
E. Peli, "Contrast in complex images," J. Opt. Soc. Am. A, 7, 2032-40, 1990.
A. B. Watson and J. A. Solomon, "Model of visual contrast gain control and pattern masking," J. Opt. Soc. Am. A, 14, 2379-91, 1997.
G. Westheimer, S. Brincat, and C. Wehrhahn, "Contrast dependency of foveal spatial functions: orientation, vernier, separation, blur and displacement discrimination and the tilt and Poggendorff illusions," Vision Research, 39, 1631-39, 1999.

(Continued)

*Primary Examiner* — Seyed Azarian
(74) *Attorney, Agent, or Firm* — Christopher J. Menke; Robert M. Padilla

(57) ABSTRACT

A method of measuring motion blur is disclosed comprising obtaining a moving edge temporal profile $r_1(k)$ of an image of a high-contrast moving edge, calculating the masked local contrast $m_1(k)$ for $r_1(k)$ and the masked local contrast $m_2(k)$ for an ideal step edge waveform $r_2(k)$ with the same amplitude as $r_1(k)$, and calculating the measure or motion blur $\Psi$ as a difference function, $$\Omega = S(\Delta x \Sigma_k |m_1(k) - m_2(k)|^\beta)^{1/\beta}.$$

The masked local contrasts are calculated using a set of convolution kernels scaled to simulate the performance of the human visual system, and $\Psi$ is measured in units of just-noticeable differences.

16 Claims, 6 Drawing Sheets

(56) References Cited

OTHER PUBLICATIONS

A. B. Watson and A. J. Ahumada, Jr., "A standard model for foveal detection of spatial contrast," J Vision, 5, 717-40, 2005.

Video Electronics Standards Association (VESA), "Flat Panel Display Measurements (FPDM2), Tech. Rep. 2.0 Update, May 2005", Video Electronics Standards Association, Milpitas, CA, 2005.

A. B. Watson, "The Spatial Standard Observer: A human vision model for display inspection," SID Symposium Digest of Technical Papers, 37, 1312-15, 2006.

A. J. Ahumada, M. T. San-Martin, and J. Gille, "Symbol discriminability models for improved flight displays," SPIE Proceedings, 30, 6057, 2006.

S. Tourancheau, P. Le Callet, K. Brunnström, and B. Andrén, "Psychophysical study of LCD motion-blur perception," Human Vision and Electronic Imaging, 2009.

A. B. Watson, "Display motion blur: Comparison of measurement methods," J. Soc. Information Display, 18, 179-90, 2010.

A. B. Watson and A. J. Ahumada, "Blur clarified: A review and synthesis of blur discrimination," J. Vision, 11(5): 10, 1-23, doi: 10.1167/11.5.10, 2011.

* cited by examiner

VISIBLE MOTION BLUR

RELATED APPLICATION

This application claims priority to U.S. Provisional Patent Application No. 61/520,357 filed May 24, 2011, which is hereby incorporated by reference.

ORIGIN OF THE INVENTION

The invention described herein was made by an employee of the United States Government and may be manufactured and used by or for the Government of the United States of America for governmental purposes without the payment of any royalties thereon or therefor.

FIELD OF THE INVENTION

One or more embodiments of the present invention relate to methods for measuring motion blur in imaging systems.

BACKGROUND

Motion blur is a significant defect of most current display technologies. Motion blur arises when the display presents individual frames that persist for significant fractions of a frame duration. When the eye smoothly tracks a moving image, the image is smeared across the retina during the frame duration. Although motion blur may be manifest in any moving image, one widely used test pattern is a moving edge. This pattern gives rise to measurements of what is called moving-edge blur.

A number of methods have been developed to measure moving edge blur, among them pursuit cameras, so-called digital pursuit cameras, and calculations starting from the step response of the display. These methods generally yield a waveform—the moving edge temporal profile (METP)—that describes the cross-sectional profile of the blur [1].

Several methods have also been developed to convert this waveform to a single-number metric of motion blur. Examples are the Blur Edge Time (BET), Gaussian Edge Time (GET), and Perceptual Blur Edge Time (PBET) [1]. However, none of these metrics attempts to provide a perceptual measure of the amount of motion blur.

First, none of these metrics takes into account the contrast of the edge, and its effect upon perceived blur. In general, blur becomes less visible when contrast decreases [2, 3], and the apparent width of motion blur declines with reduced contrast [4]. Second, contrast of the edge will mask the visibility of the blur [5, 6]. Thus a model of blur visibility must take into account this masking effect.

The need to incorporate contrast is especially pressing because measurements of motion blur are often made at several contrasts (gray-to-gray transitions) [7, 8]. Those separate measurements must then be combined in some perceptually relevant way.

Finally, none of the existing metrics take into account the visual resolution of the display (pixels/degree of visual angle). For a given speed in pixels/frame, a higher visual resolution will yield a less visible artifact.

SUMMARY OF THE INVENTION

A method of measuring motion blur is disclosed comprising obtaining a moving edge temporal profile $r_1(k)$ of an image of a high-contrast moving edge, calculating the masked local contrast $m_1(k)$ for $r_1(k)$ and the masked local contrast $m_2(k)$ for an ideal step edge waveform $r_2(k)$ with the same amplitude as $r_1(k)$, and calculating the measure or motion blur $\Psi$ as a difference function, $$\Psi = S(\Delta x \Sigma_k |m_1(k) - m_2(k)|^\beta)^{1/\beta}.$$

The masked local contrasts are calculated using a set of convolution kernels scaled to simulate the performance of the human visual system, and $\Psi$ is measured in units of just-noticeable differences.

DETAILED DESCRIPTION

Figure 1:
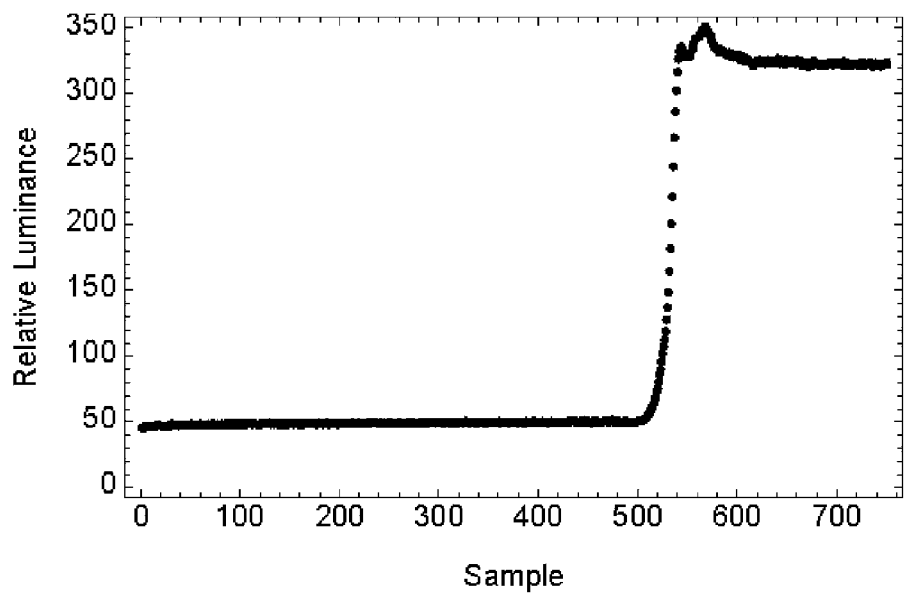
FIG. 1 shows an example of a moving edge temporal profile (METP) for a blurred edge.

Before the present invention is described in detail, it is to be understood that unless otherwise indicated this invention is not limited to specific imaging systems.

It must be noted that as used herein and in the claims, the singular forms "a," "and" and "the" include plural referents unless the context clearly dictates otherwise. Thus, for example, reference to "an imaging system" includes two or more imaging systems, and so forth.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention. Where the modifier "about" is used, variations of ±10% are considered to be within the scope of the disclosed limit.

As used herein, the following symbol definitions apply:

TABLE 1

| Symbol | Definition | Example | Unit |
|---|---|---|---|
| k | integer sample index | $-\frac{N_t}{2} \ldots \frac{N_t}{2} - 1$ | dimensionless |
| r(k) | an arbitrary luminance waveform | | relative luminance |
| $r_1$(k) | r(k) for a moving edge (METP) | | relative luminance |
| $r_2$(k) | r(k) for an ideal step edge | | relative luminance |
| $R_0$ | lower luminance level for step | 50 | relative luminance |
| $R_1$ | upper luminance level for step | 330 | relative luminance |
| Δt | time between samples | 0.02867 | frames |
| Δx | distance between samples | 0.007167 | degrees of visual angle |
| p | speed of moving edge | 16 | pixels/frame |
| v | visual resolution | 64 | pixels/degree |
| μ | center of cumulative Gaussian | | degrees of visual angle |
| σ | standard deviation of cumulative Gaussian | 0.0468 | degrees of visual angle |
| g | cumulative Gaussian | | relative luminance |
| N | number of standard deviations for trim | 32 | dimensionless |
| $N_t$ | number of samples in waveform after trim | | dimensionless |
| $h_c$(k) | center kernel | | dimensionless |
| $s_c$ | scale of center kernel | 2.77 | degrees of visual angle |
| $h_s$(k) | surround kernel | | dimensionless |
| $s_s$ | scale of surround kernel | 21.6 | degrees of visual angle |
| $h_m$(k) | masking kernel | | dimensionless |
| $s_m$ | scale of masking kernel | 10 | degrees of visual angle |
| κ | adaptation weight | 0.772 | dimensionless |
| $\overline{R}$ | mean relative luminance, typically $(R_0 + R_1)/2$ | 190 | relative luminance |
| T | masking threshold | 0.3 | contrast |
| S | sensitivity | 217.6 | dimensionless |
| β | pooling exponent | 2 | dimensionless |

The present invention discloses a perceptual metric for motion blur called Visible Motion Blur (VMB). VMB incorporates the three effects described in the Background section: contrast, masking, and visual resolution. It is based on the Spatial Standard Observer [9]. VMB converts a moving edge temporal profile (METP) waveform into a measure of motion blur quantified in units of just noticeable differences (JNDs). JND is a standard perceptual measure in which one JND is the least quantity that can be seen with specified reliability.

The starting point for the VMB metric is the METP, a discrete sequence of relative luminances, which we write here as $r_1$(k), where k represents an integer sample index, and the time between samples is Δt in units of frames. This waveform is a standard physical measurement of motion blur and can be acquired in several ways [1]. These generally involve estimating the width of an edge subjected to motion blur.

The edge can be captured in any of three ways. The first method employs a pursuit camera that tracks a vertical edge (between two gray levels) as it moves horizontally across the screen. The camera is simulating the eye as it pursues the moving edge. The result, after averaging over time, is a picture of the blurred edge. After averaging over the vertical dimension (orthogonal to the motion), a one-dimensional waveform representing the cross-section of the blurred edge can be obtained. It describes relative luminance (a linear function of luminance) as a function of horizontal position in pixels. When recorded at several speeds of edge motion, the waveforms are usually found to correspond when the horizontal scale is divided by the speed. Therefore, it is conventional to rescale the horizontal axis of the profile (pixels) by dividing by the speed (pixels/frame) to obtain a waveform that is a function of time (frames)—the METP. It is also conventional to characterize the width of the METP in terms of the time interval between 10% and 90% points of the curve. This quantity is called the blur edge time (BET).

The second method employs a stationary high-speed camera. With a sufficiently high frame rate, it is possible to capture a sequence of frames, that, with appropriate shifting and adding, can also yield a record of the METP. The high-speed camera avoids the mechanical challenges of the pursuit camera. This second method can be called "digital pursuit."

The third method employs a fixed non-imaging detector such as a photodiode, which measures the luminance over time as the display is switched from one gray level to another. This temporal step response is then convolved with a pulse of duration equal to the hold time (for an LCD, typically one frame), to obtain another version of the METP. This third method can be called the "temporal step" method. The temporal step method relies on an assumption that all pixels are independent. It has been demonstrated to be accurate in many cases, but may fail when motion-dependent processing is present.

An example of an METP is shown in FIG. 1. In this example Δt=0.02867 (i.e., 1/35 frame). Δt can be selected so that there are at least 10 samples across the step in luminance so that the blur is well resolved. The data from FIG. 1 will be used throughout the exemplary embodiment of the invention below. Note that FIG. 1 has a non-zero black-level. This is typical of situations where the METP is recorded in a dark environment, but the visibility of motion blur is to be estimated for a lit environment. A suitable "veiling luminance" can be added to the METP to accommodate this background level.

An exemplary embodiment of the calculation of the VMB metric is as follows. The first step is to determine the distance between samples Δx in units of degree of visual angle. This is given by $$\Delta x = \frac{p\Delta t}{v}, \quad (1)$$

where p is the assumed speed of edge motion in pixels/frame and v is the visual resolution of the display in pixels/degree. For example, if p=16 pixels/frame and v=64 pixels/degree, then $\Delta x=0.007167$ degrees.

The waveform r(k) consists of a transition between two relative luminance levels $R_0$ and $R_1$ (FIG. 1). ($R_0$ is non-zero in the example of FIG. 1 to show inclusion of veiling luminance.) It is useful (although not necessary) to trim the sequence $r_1(k)$ to the neighborhood of the transition to reduce subsequent computations. The waveform can be fitted to a cumulative Gaussian $$g(k; \mu, \sigma, R_0, R_1) = R_0 + \frac{R_1 - R_0}{2}\left(1 + \operatorname{erf}\left[\frac{k\Delta x - \mu}{\sqrt{2}\,\sigma}\right]\right), \quad (2)$$

where $\mu$ is the center of the Gaussian, and $\sigma$ is the width (standard deviation). The waveform can then be trimmed to values of k that are within N standard deviations of the mean, that is, a portion of $r_1(k)$ is selected for which $$|k\Delta x - \mu| \le N\sigma. \quad (3)$$

Figure 2:
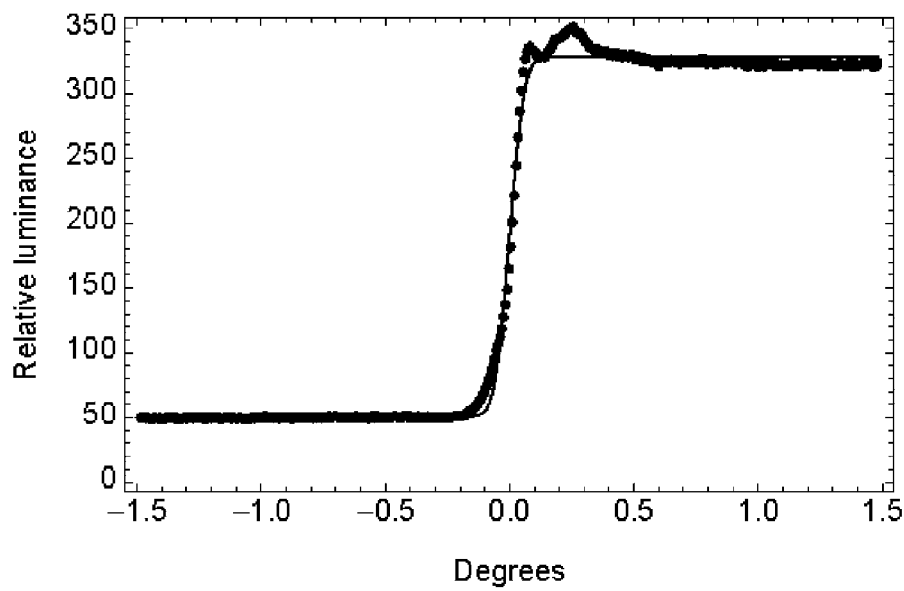
FIG. 2 shows a fit of a cumulative Gaussian curve to the waveform of FIG. 1.

FIG. 2 shows the fit to the example METP waveform from FIG. 1. The waveform has also been trimmed using N=32, and the horizontal coordinate has been converted to degrees relative to $\mu$ (i.e., the horizontal axis is $k\Delta x$ rather than k). It can also be convenient to make the length of the sequence an even number by deleting the last point if necessary. The length of the trimmed sequence is N. The waveform shown in FIG. 2, plotted against a spatial distance (degrees of visual angle) instead of time (frames) is sometimes referred to as a "Moving Edge Spatial Waveform" (MESP). When this terminology is used, an METP is converted to an MESP using the relationship between $\Delta x$ and $\Delta t$ given in equation 1.

The next step is to create three convolution kernels, $h_c(k)$, $h_s(k)$, and $h_m(k)$. These are discrete sequences obtained by evaluating kernel functions at a discrete set of points with k-values matching those of the trimmed METP waveform:

$$k = -\frac{N_t}{2} \ldots \frac{N_t}{2} - 1. \quad (4)$$

Exemplary embodiments of the convolution kernels are given by $$h_c(k) = \frac{1}{s_c}\operatorname{sech}\pi\frac{k\Delta x}{s_c}, \quad (5)$$

$$h_s(k) = \frac{1}{s_s}\exp\left(-\pi\left(\frac{k\Delta x}{s_s}\right)^2\right), \quad (6)$$

$$h_m(k) = \frac{1}{s_m}\exp\left(-\pi\left(\frac{k\Delta x}{s_m}\right)^2\right), \quad (7)$$

Figure 3:
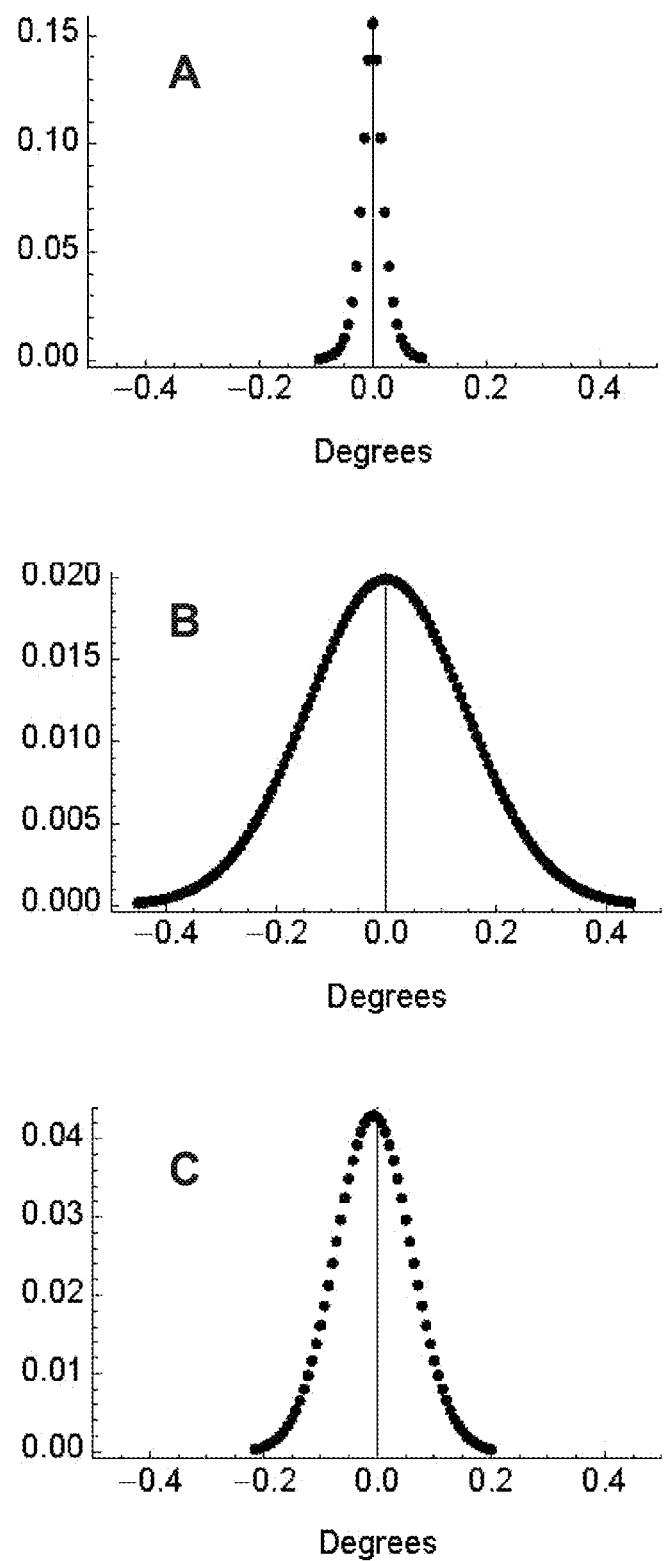
FIGS. 3 A-C show examples of the center, surround, and masking kernels.

These are called the "center" kernel, the "surround" kernel, and the "masking" kernel respectively. These kernels have "scales" (i.e., widths in the k-direction) of $s_c$, $s_s$, and $s_m$, respectively, measured in degrees of visual angle. Each kernel is normalized to have an integral of 1. The first two can be thought of as simulating the processing of the luminance waveform by retinal ganglion cells with antagonistic center and surround components. Values of about 2.77 min and 21.6 min (i.e., 2.77/60 and 21.6/60 degrees of visual angle) are found to approximate human visual sensitivity. The center component incorporates the blur due to the visual optics, and possibly further early neural pooling, while the surround computes an average of the local luminance, and uses it to convert luminance to local contrast [10]. With the range defined by Equation 4, the kernels are each of the same length as the trimmed sequence. To reduce computation, they can alternatively be made of shorter and different lengths, each approximately four times its respective scale. Examples of the three kernels are shown in FIGS. 3 A-C using a horizontal axis scale corresponding to the center one third of that of FIG. 2.

One of ordinary skill will recognize that the functional form of all of the kernels can vary provided that they generally have the indicated scales and are suitably normalized to have an integral of 1. The surround and masking kernel examples use Gaussian waveforms, while the center kernel example uses a hyperbolic secant. These produce similar peaked waveforms with differing tail shapes: a Gaussian tail decreases as $\exp(-[k\Delta x]^2)$, while the hyperbolic secant tail decreases as $\exp(-k\Delta x)$. Other similar peaked waveforms can also be used with similar results. A Cauchy or Lorentz waveform has tails which decrease as $(k\Delta x)^{-2}$. Similar functional forms can be readily devised which decrease as any even power of $k\Delta x$. The special case of "zero" power is also possible using a rectangular waveform with a width equal to one over the height. The example waveforms given in equations 5-7 are generally found to provide good correlation with the characteristics of the human visual system.

The trimmed waveform is convolved with the center and surround kernels $h_c$ and $h_s$ to yield $h_c*r_1$ and $h_s*r_1$, where * is the convolution operator. For example, $$h_c(k)*r_1(k)=\Sigma_i h_c(i)r_1(k-i)\Delta x. \quad (8)$$

Figure 4:
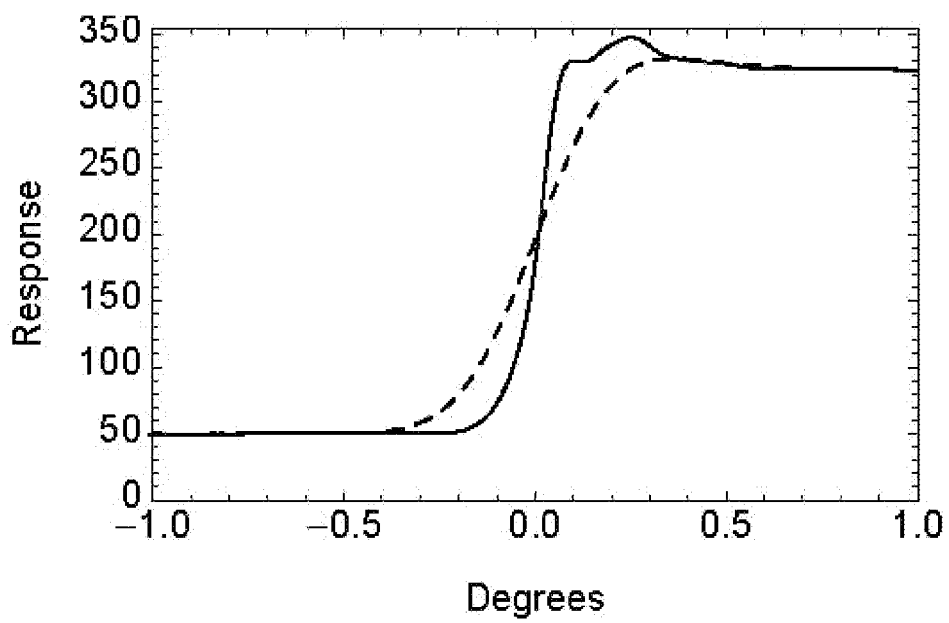
FIG. 4 shows the results of the convolutions of the center and surround kernels of FIG. 3 with the waveform of FIG. 2.

In principle, the sum is over all i-values from $-\infty$ to $\infty$; in practice, it is sufficient to sum over i-values where $h_c(i)$ differs significantly from zero. FIG. 4 shows the results of these two convolutions for the waveform of FIG. 2 and the kernels of FIG. 3. The convolution with the center kernel is shown as a solid line, and the convolution with the surround kernel is shown as a dashed line.

Next, the local contrast waveform c(k) is computed. c(k) is defined by $$c(k) = \frac{h_c * r_1}{\kappa(h_s * r_1) + (1-\kappa)\overline{R}} - 1, \quad (9)$$

where $\kappa$ is an "adaptation weight" parameter and $\overline{R}$ is the mean relative luminance, typically computed as the average of the maximum and minimum relative luminances $R_0$ and $R_1$, as estimated from the fit of the cumulative Gaussian of Equation 2. The effective local contrast energy e(k) is computed using the masking kernel $h_m$ and a masking threshold parameter T:

$$e(k) = h_m(k) * \left(\frac{c(k)}{T}\right)^2. \quad (10)$$

The masked local contrast m(k) is computed as $$m(k) = \frac{c(k)}{\sqrt{1+e(k)}}. \quad (11)$$

Figure 5:
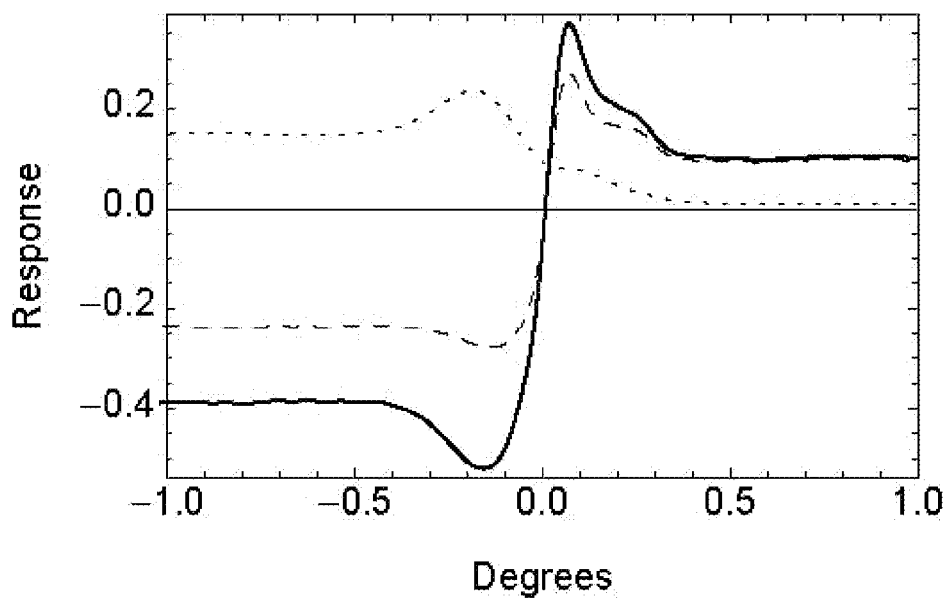
FIG. 5 shows the contrast waveform, local contrast energy, and masked local contrast for the waveform of FIG. 2.

FIG. 5 shows $c_1(k)$ (solid line), $e_1(k)$ (short-dashed line), and $m_1(k)$ (long-dashed line) for the waveform of FIG. 2 and the kernels of FIG. 3. This model of masking is similar to that developed by Ahumada in a study of symbol discrimination [11, 12, 13]. In these calculations, the local contrast energy $e(k)$ is a measure of the visually effective pattern ensemble in the neighborhood of a point k, and it determines the amount of masking of nearby contrast patterns. Patterns are less visible when they are superimposed on other patterns.

To compute the visibility of the motion blur, we compare the masked contrast waveform $m_1$ for the test edge as computed above to the masked contrast waveform $m_2$ for an ideal edge of the same starting and ending luminance. The visible motion blur (VMB) can now be calculated in units of just noticeable differences (JNDs) by $$\Psi = S(\Delta x \Sigma_k |m_1(k) - m_2(k)|^\beta)^{1/\beta}, \quad (12)$$

where S and β are parameters (a "sensitivity" and a "pooling exponent"). The location of the ideal edge is adjusted to find the minimum value of Ψ [12, 13]. The value of Ψ will still depend on the alignment of the blurred and ideal edges. The effective visible difference corresponds to the minimum of Ψ. This can be determined by computing V for various shifts of the ideal edge, as described below.

In greater detail, an ideal step edge waveform (defined for the k-range given by Equation 4) is given by $$r_2(k) = R_0 + (R_1 - R_0)\text{step}(k-\delta), \quad (13)$$

where step is the unit step function, and δ is between 1 and $N_r$. δ can, but need not, be an integer. The contrast waveforms $c_2(k)$, $e_2(k)$, and $m_2(k)$ are computed as above substituting $r_2(k)$ for $r_1(k)$, and then JND is computed using Equation 12. This process is repeated for each possible value of δ and the smallest value of iris selected as the final value of VMB.

Figure 6:
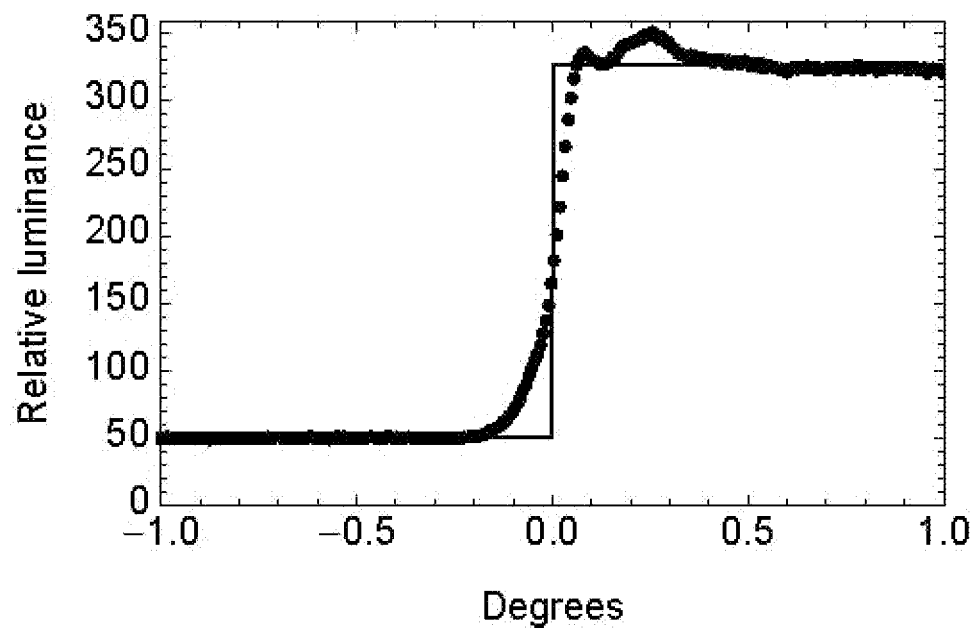
FIG. 6 shows an ideal step edge overlaid on the METP waveform.
Figure 7:
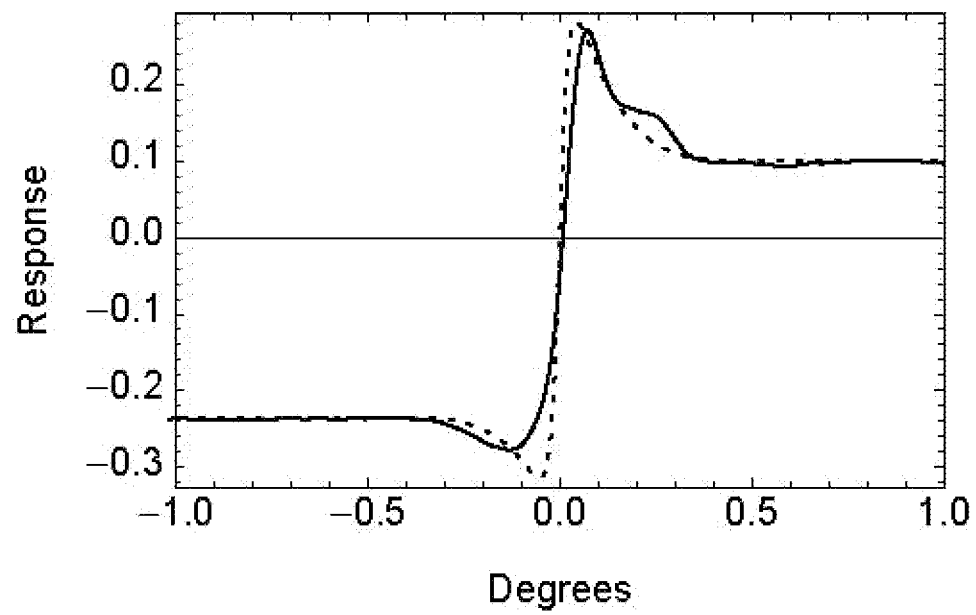
FIG. 7 shows the masked local contrast waveforms for the two waveforms of FIG. 6.
Figure 8:
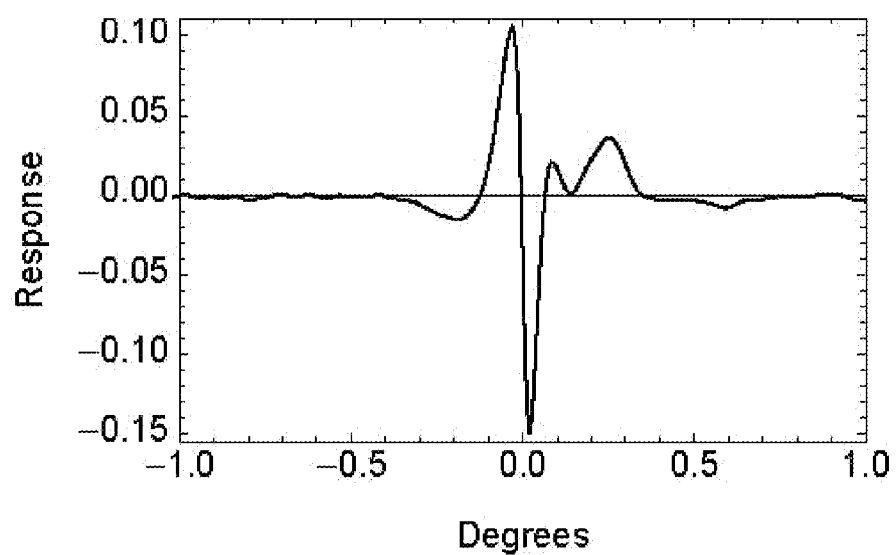
FIG. 8 shows the difference between the two masked local contrast waveforms of FIG. 7.
Figure 9:
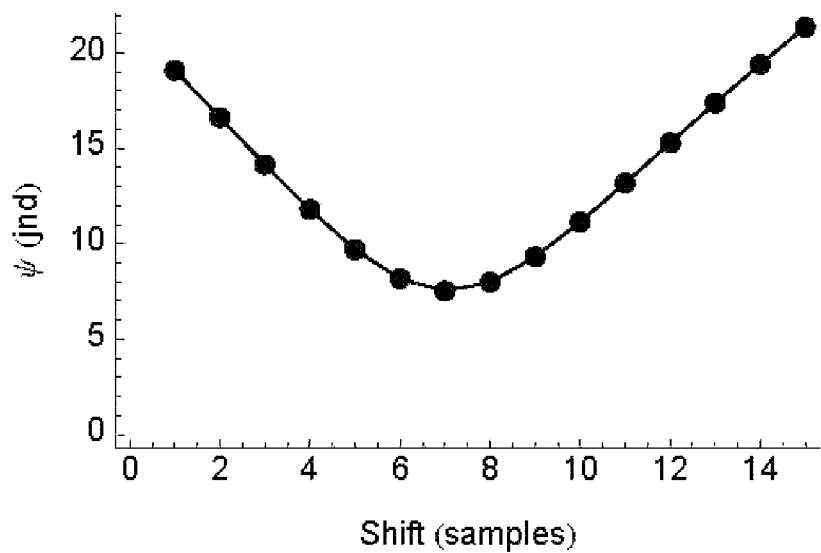
FIG. 9 shows the value of visual motion blur as a function of the offset of the ideal step edge waveform from the METP waveform.

FIG. 6 shows the two input waveforms: the example waveform $r_1(k)$ (dotted line) and the ideal edge $r_2(k)$ (solid line), and FIG. 7 shows the masked local contrast waveforms $m_1(k)$ (dotted line) and $m_2(k)$ (solid line). FIG. 8 shows the difference between the two masked local contrasts. FIG. 9 shows ψ as a function of the shift δ. The minimum is 7.5 JNDs. In this example, the motion blur is calculated to be clearly visible, because the VMB is substantially larger than 1 JND.

There are several adjustable parameters in the calculation described above. These parameters can be chosen to mimic the response of the human visual system to the motion blur of a particular test image. The parameters are summarized in Table 2. Values that have been tuned to provide a good match to human perception are provided as "example values." However, the parameters can vary over the "usable range" to provide alternate embodiments of the present invention. The calculation of VMB incorporates several important features of human contrast detection: light adaptation (in the conversion to contrast), a contrast sensitivity function (via convolution with center and surround kernels h2, and $h_s$ in Equation 9), masking (via the masking kernel $h_m$, and Equation 11), and non-linear pooling over space (via the power function and pooling convolution in Equation 12). Masking can provide an important function, because the detection of blur comprises detection of a small contrast (the departure from the perfect edge) superimposed on a large contrast pattern (the edge itself).

TABLE 2

| symbol | definition | units | example value | usable range |
|---|---|---|---|---|
| $s_c$ | center scale | degrees | 2.77/60 | ±50% |
| $s_s$ | surround scale | degrees | 21.6/60 | ±50% |
| $s_m$ | masking scale | degrees | 10/60 | 1/60 - 60/60 |
| T | masking threshold | contrast | 0.3 | 0-1 |
| S | sensitivity | dimensionless | 217.6 | ±50% |
| β | pooling exponent | dimensionless | 2 | 1-6 |
| κ | adaptation weight | dimensionless | 0.772 | 0-1 |

It will be understood that the descriptions of one or more embodiments of the present invention do not limit the various alternative, modified and equivalent embodiments which may be included within the spirit and scope of the present invention as defined by the appended claims. Furthermore, in the detailed description above, numerous specific details are set forth to provide an understanding of various embodiments of the present invention. However, one or more embodiments of the present invention may be practiced without these specific details. In other instances, well known methods, procedures, and components have not been described in detail so as not to unnecessarily obscure aspects of the present embodiments.

REFERENCES

The following references are hereby incorporated by reference in their entireties:

[1] A. B. Watson, "Display motion blur: Comparison of measurement methods," *J. Soc. Information Display*, 18, 179-90, 2010.

[2] J. R. Hamerly and C. A. Dvorak, "Detection and discrimination of blur in edges and lines," *J. Opt. Soc. Am.*, 71, 448, 1981.

[3] G. Westheimer, S. Brincat, and C. Wehrhahn, "Contrast dependency of foveal spatial functions: orientation, vernier, separation, blur and displacement discrimination and the tilt and Poggendorff illusions," *Vision Research*, 39, 1631-39, 1999.

[4] S. Tourancheau, P. Le Callet, K. Brunnstrom, and B. Andrén, "Psychophysical study of LCD motion-blur perception," *Human Vision and Electronic Imaging*, 2009.

[5] G. E. Legge and J. M. Foley, "Contrast masking in human vision," *J. Opt. Soc. Am.*, 70, 1458-71, 1980.

[6] A. B. Watson and J. A. Solomon, "Model of visual contrast gain control and pattern masking," *J. Opt. Soc. Am. A*, 14, 2379-91, 1997.

[7] Video Electronics Standards Association (VESA), "Flat Panel Display Measurements Standard (FPDM), Version 2.0," Video Electronics Standards Association, Milpitas, Calif., 2001.

[8] Video Electronics Standards Association (VESA), "Flat Panel Display Measurements (FPDM2), Tech. Rep. 2.0 Update, May 2005", Video Electronics Standards Association, Milpitas, Calif., 2005.

[9] A. B. Watson, "The Spatial Standard Observer: A human vision model for display inspection," *SID Symposium Digest of Technical Papers*, 37, 1312-15, 2006.

[10] E. Peli, "Contrast in complex images," *J. Opt. Soc. Am. A*, 7, 2032-40, 1990.

[11] A. J. Ahumada, M. T. San-Martin, and J. Gille, "Symbol discriminability models for improved flight displays," *SPIE Proceedings*, 30, 6057, 2006.

[12] A. B. Watson and A. J. Ahumada, Jr., "A standard model for foveal detection of spatial contrast," *J Vision*, 5, 717-40, 2005.

[13] A. B. Watson and A. J. Ahumada, "Blur clarified: A review and synthesis of blur discrimination," *J. Vision*, 11(5): 10, 1-23, doi: 10.1167/11.5.10, 2011.

What is claimed is:

1. A method of measuring visual motion blur $\Psi$ comprising obtaining a moving edge temporal profile $r_1(k)$ of an image of a high-contrast moving edge with at least 10 samples across the step in $r_1(k)$;

calculating $m_1(k)=m(k)$ for $r(k)=r_1(k)$, and $m_2(k)=m(k)$ for $r(k)=r_2(k)$, wherein $r_2(k)$ is the waveform for an ideal step edge waveform with the same amplitude as $r_1(k)$; and calculating $\Psi$ as a difference function, $$\Psi = S(\Delta x \Sigma_k |m_1(k) - m_2(k)|^\beta)^{1/\beta},$$

where $\Delta x$ is the sample interval in degrees of visual angle, S and $\beta$ are parameters, m(k) is the masked local contrast, $$m(k) = \frac{c(k)}{\sqrt{1+e(k)}},$$

e(k) is the effective local contrast energy, $$e(k) = h_m(k) \left( \frac{c(k)}{T} \right)^2,$$

$h_m(k)$ is a masking kernel having a masking scale $s_m$ and unit area,

T is a masking threshold parameter, c(k) is the local contrast waveform, $$c(k) = \frac{h_c(k) * r(k)}{\kappa[h_s(k) * r(k)] + (1-\kappa)\overline{R}} - 1,$$

$h_c(k)$ is a center kernel having a center scale $s_c$ and unit area, $h_s(k)$ is a surround kernel having a surround scale $s_s$ and unit area, $\overline{R}$ is the mean relative luminance of $r_1(k)$ or, $\kappa$ is an adaptation weight parameter, and r(k) is an arbitrary waveform;

wherein the offset of the ideal step edge relative to $r_1(k)$ is adjusted to minimize $\Psi$; utilizing the measured visual motion blur to provide just noticeable differences of motion blur in display technology, where the measured visual motion blur is based on obtaining the moving edge temporal profile r1(k) of an image, calculating m1(k) and m2(k), and calculating visual motion blur as a difference function.

2. The method of claim 1, wherein the center kernel is given by $$h_c(k) = \frac{1}{s_c} \operatorname{sech} \pi \frac{k \Delta x}{s_c}.$$

3. The method of claim 2, wherein the surround kernel is given by $$h_s(k) = \frac{1}{s_s} \exp\left(-\pi \left(\frac{k \Delta x}{s_s}\right)^2\right).$$

4. The method of claim 3 wherein the surround kernel scale $s_s$ is about 7.8 times the center kernel scale $s_c$.

5. The method of claim 2, wherein the masking kernel is given by $$h_m(k) = \frac{1}{s_m} \exp\left(-\pi \left(\frac{k \Delta x}{s_m}\right)^2\right).$$

6. The method of claim 5 wherein the masking kernel scale $s_m$ is about 3.6 times the center kernel scale $s_c$.

7. The method of claim 5 wherein the center kernel scale $s_c$ is between about 1.38/60 and about 4.16/60 degrees of visual angle, the surround kernel scale $s_s$, is between about 21.6/60 and about 32.4/60 degrees of visual angle, and the masking kernel scale $s_m$ is between about 1/60 and 60/60 degrees of visual angle.

8. The method of claim 7, wherein the center kernel scale $s_c$ is about 2.77/60 degrees of visual angle, the surround kernel scale $s_s$ is about 10.8/60 degrees of visual angle, and the masking kernel scale $s_m$ is about 10/60 degrees of visual angle.

9. The method of claim 1, wherein T is between 0 and 1.

10. The method of claim 9, wherein T is about 0.3.

11. The method of claim 1, wherein S is between about 109 and about 326.

12. The method of claim 11, wherein S is about 217.6.

13. The method of claim 1, wherein $\beta$ is between 1 and 6.

14. The method of claim 13 wherein $\beta$ is 2.

15. The method of claim 1, wherein $\kappa$ is between 0 and 1.

16. The method of claim 15, wherein $\kappa$ is about 0.772.

* * * * *